United States Patent
Rahman et al.

(10) Patent No.: US 8,929,315 B2
(45) Date of Patent: Jan. 6, 2015

(54) METHOD AND SYSTEM FOR COEXISTENCE BETWEEN WIRELESS COMMUNICATION NETWORKS

(75) Inventors: Mohammad Azizur Rahman, Koganei (JP); Gabriel Porto Villardi, Koganei (JP); Zhou Lan, Koganei (JP); Tuncer Baykas, Koganei (JP); Chang-Woo Pyo, Koganei (JP); Chunyi Song, Koganei (JP); Chin-Sean Sum, Koganei (JP); Junyi Wang, Koganei (JP); Hiroshi Harada, Koganei (JP)

(73) Assignee: National Institute of Information and Communications Technology, Tokyo (JP)

( * ) Notice: Subject to any disclaimer, the term of this patent is extended or adjusted under 35 U.S.C. 154(b) by 122 days.

(21) Appl. No.: 13/583,720

(22) PCT Filed: Feb. 28, 2011

(86) PCT No.: PCT/JP2011/001151
§ 371 (c)(1),
(2), (4) Date: Sep. 10, 2012

(87) PCT Pub. No.: WO2011/111329
PCT Pub. Date: Sep. 15, 2011

(65) Prior Publication Data
US 2013/0010747 A1    Jan. 10, 2013

(30) Foreign Application Priority Data
Mar. 10, 2010 (JP) .................. 2010-053821

(51) Int. Cl.
| | |
|---|---|
| H04W 4/00 | (2009.01) |
| H04W 16/14 | (2009.01) |
| H04W 16/16 | (2009.01) |
| H04W 72/12 | (2009.01) |
| H04W 72/04 | (2009.01) |

(52) U.S. Cl.
CPC ............. *H04W 16/14* (2013.01); *H04W 16/16* (2013.01); *H04W 72/1215* (2013.01); *H04W 72/04* (2013.01)

USPC ......................................................... 370/329

(58) Field of Classification Search
None
See application file for complete search history.

(56) References Cited

U.S. PATENT DOCUMENTS

| | | | |
|---|---|---|---|
| 5,732,076 A | 3/1998 | Ketseoglou et al. | |
| 8,401,478 B2 * | 3/2013 | Kwak et al. ..................... | 455/62 |
| 2007/0253394 A1 * | 11/2007 | Horiguchi et al. ............ | 370/338 |

(Continued)

FOREIGN PATENT DOCUMENTS

| | | |
|---|---|---|
| JP | 2007-300419 | 11/2007 |
| JP | 2008-211583 | 9/2008 |

OTHER PUBLICATIONS

Author Unknown, IEEE P802.19 Wireless Coexistence System Design Document, Mar. 18, 2010, pp. 1-15.*

*Primary Examiner* — Christopher Crutchfield
(74) *Attorney, Agent, or Firm* — Jacobson Holman Hershkovitz, PLLC.

(57) ABSTRACT

One wireless communication network 3 determines an interference degree with the corresponding other wireless communication network 3 for each channel by accessing a CMDB 2 storing positional information, channel information, and respective coexistence methods of other wireless communication networks 3, selects other wireless communication network 3 to coexist, a coexisting channel, and a coexisting method thereof based on the interference degree for each determined channel, and reflects the selected network, channel, and coexistence method to the CMDB 2, and transmits a signal for requesting coexistence with respect to selected wireless communication network, to the CMDB 2, and the selected wireless communication network 3 performs a control for coexistence in the communication space between one wireless communication network and the selected wireless communication network based on the channel reflected to the CMDB 2 and the coexisting method thereof.

8 Claims, 10 Drawing Sheets

(56) References Cited

U.S. PATENT DOCUMENTS

| | | |
|---|---|---|
| 2008/0247445 A1 | 10/2008 | Guo et al. |
| 2008/0268832 A1* | 10/2008 | Peng .............................. 455/424 |
| 2009/0270025 A1* | 10/2009 | Kossi et al. .................. 455/3.01 |
| 2010/0309806 A1* | 12/2010 | Wu et al. ....................... 370/252 |

* cited by examiner

METHOD AND SYSTEM FOR COEXISTENCE BETWEEN WIRELESS COMMUNICATION NETWORKS

This is a national stage of PCT/JP11/001151 filed Feb. 28, 2011 and published in Japanese, which has a priority of Japanese no. 2010-053821 filed Mar. 10, 2010, hereby incorporated by reference.

BACKGROUND OF THE INVENTION

1. Field of the Invention

The present invention relates to a method and system for coexistence between wireless communication networks which coexist in a communication space by time division or frequency division among a plurality of wireless communication networks.

2. Description of the Related Art

In recent years, the number of subscriptions in a wireless communication system has increased, or the advancement and diversity of a service has been developed. In this case, when a plurality of wireless communication networks coexist in the same communication space and the same frequency band, the wireless communication networks cause communication interference in each other. As a result, a method for coexistence between the wireless communication networks which coexist in a communication space by time division or frequency division among the plurality of wireless communication networks has been required from the related art.

For example, in a method for coexistence in the communication space by time division among the plurality of wireless communication networks, a time frame constituted by a plurality of time slots is divided into several time slot groups, and the divided time slot groups are allocated to respective systems.

Further, in a method for coexistence in the communication space by frequency division among the plurality of wireless communication networks, a predetermined frequency band is divided into two or more partial frequency bands, and the divided partial frequency bands are allocated to respective systems.

As the method for coexistence between the wireless communication networks in the related art, for example, methods illustrated in U.S. Pat. No. 5,732,076 and US Patent Application No. 2008/247,445 are proposed.

FIG. 10 illustrates a general example in which communication interference between a wireless communication network 61 and another network occurs. In this example, the wireless communication network 61 includes a device 72 based on a channel A and a coordinator 71 controlling the entire network. In this case, other wireless communication networks 62 and 63 of which communication spaces overlap with the wireless communication network 61 exist. Communication interference between the wireless communication network 62 and the wireless communication network 61 caused by using the channel A, similarly as the wireless communication network 61. In this regard, communication interference between the wireless communication network 63 and the wireless communication network 61 using the channel A does not occur since the wireless communication network 63 uses channel B.

A wireless communication network 64 uses the channel A, similarly as the wireless communication network 61, but communication interference does not particularly occur since the wireless communication network 64 uses a communication space different from the wireless communication network 61.

That is, the communication space overlaps with the wireless communication network 61 and interference occurs between the wireless communication network 64 and other wireless communication network 62 using a common channel.

SUMMARY OF THE INVENTION

The present invention has been made in an effort to provide a method and system for preventing communication interference between the wireless communication networks, and enabling coexistence between wireless communication networks, which are suitable for coexistence in a communication space by time division or frequency division.

According to the invention, a method for coexistence between wireless communication networks which coexist in a communication space by time division and/or frequency division among a plurality of wireless communication networks, comprising: by one wireless communication network, determining an interference degree with the corresponding other wireless communication network for each channel by accessing a database storing at least positional information, channel information, and respective coexistence methods of other wireless communication networks, selecting other wireless communication network to coexist, a coexisting channel, and a coexisting method thereof based on the determined interference degree for each determined channel, and at the same time, reflecting the selected network, channel, and coexistence method to the database, transmitting a signal, for requesting coexistence with respect to the corresponding other selected wireless communication network, to the database; and performing a control for coexistence in the communication space between one wireless communication network and the corresponding other selected wireless communication network, based on the channel and the coexistence method reflected to the database, when the database is accessed by the corresponding other selected wireless communication network and the other selected wireless communication network acquires the coexistence request.

A system for coexistence between wireless communication networks which coexist in a communication space by time division and/or frequency division among a plurality of wireless communication networks, wherein one wireless communication network, determines an interference degree with the corresponding other wireless communication network for each channel by accessing a CMDB in which at least positional information, channel information, and respective coexistence methods of other wireless communication networks are stored, selects other wireless communication network to coexist, a coexisting channel, and a coexisting method thereof based on the interference degree for each determined channel and at the same time, reflects the selected network, channel, and coexistence method to the database, transmits a signal for requesting coexistence with respect to the corresponding other selected wireless communication network, to the database, and the corresponding selected other wireless communication network, performs a control for coexistence in the communication space between one wireless communication network, based on the channel and the coexistence method reflected to the database, when the database is accessed by the corresponding other selected wireless communication network to acquire the coexistence request.

As set forth above, according to embodiments of the present invention, by accessing a CMDB at least storing positional information, channel information, and respective coexistence methods of different wireless communication networks, an interference degree with the corresponding other wireless communication network is determined for each channel, other wireless communication network to coexist based on the interference degree for each determined channel, a coexisting channel, and a coexisting method thereof are selected and at the same time, are reflected to the CMDB. When a signal for requesting coexistence with the corresponding other selected wireless communication network is transmitted to the CMDB and the coexisting request is acquired by accessing the CMDB by other selected wireless communication network, a control for coexistence in a communication space between one wireless communication network and the corresponding other selected wireless communication network 3 is performed based on the channel reflected to the CMDB and the coexisting method thereof.

Therefore, according to the embodiments of the present invention, the communication interference between the wireless communication networks can be prevented, and accordingly the communication space can coexist by time division or frequency division.

DETAILED DESCRIPTION OF EMBODIMENTS

Hereinafter, as embodiment of the present invention, a system for coexistence between wireless communication networks which coexist in a communication space will be described in detail with reference to the drawings.

Figure 1:
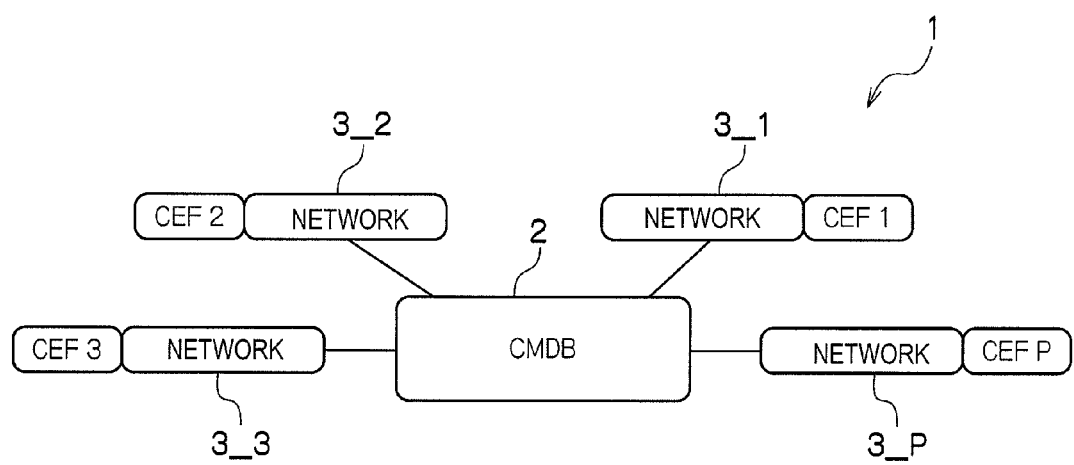
FIG. 1 is a diagram illustrating a configuration of a system for coexistence between wireless communication networks according to the present invention.

A system 1 for coexistence between wireless communication networks according to the present invention includes, for example, a plurality of wireless communication networks 3_1 to 3_P and a coexistence management and databank (CMDB) 2 to which each wireless communication network 3 is accessible, as illustrated in FIG. 1.

Figure 2:
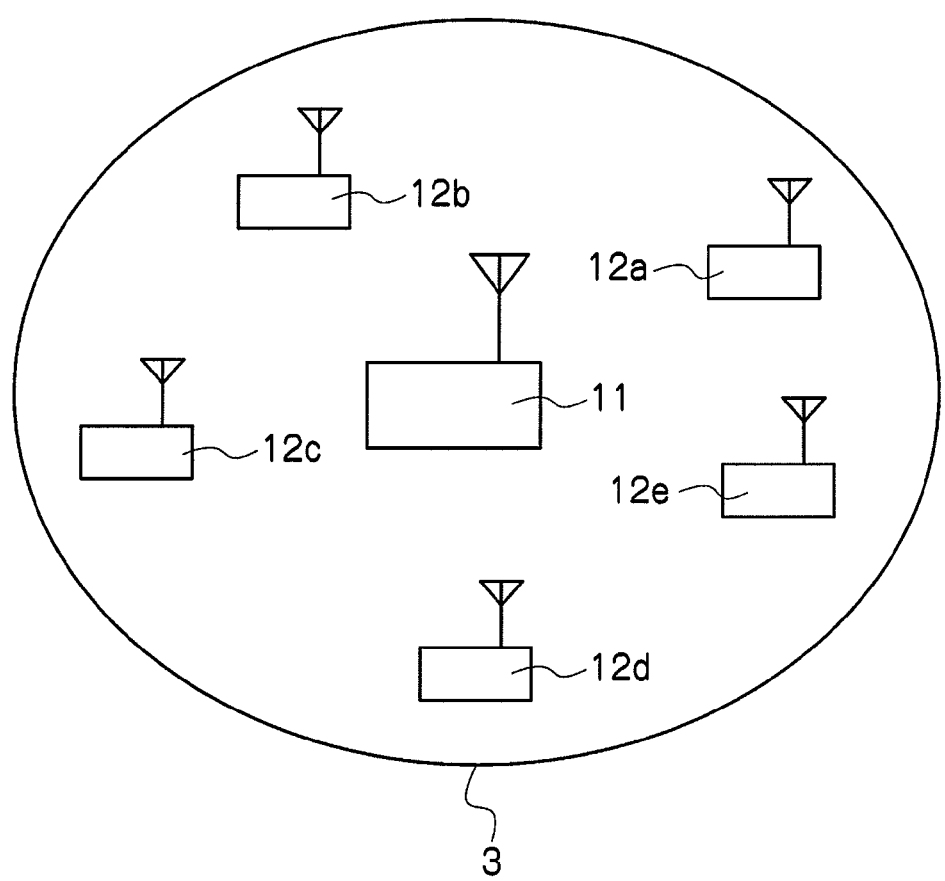
FIG. 2 is a diagram illustrating a configuration of each wireless communication network.

The wireless communication network 3 includes devices 12a to 12e and a coordinator 11 controlling the entire network, as illustrated in FIG. 2.

The devices 12a to 12e are configured by for example, a note type personal computer (notebook) or various portable information terminals including a cellular phone, and the like. The device 12 may perform wireless communication with the coordinator 11 in at least WPAN, WMAN, WLAN, WRAN, and the like and further, may perform wireless packet communication with another device 12 through the coordinator 11.

The coordinator 11 may also have the same configuration as the portable information terminal, similarly. The coordinator 11 serves as a so-called radio base station. The coordinator 11 serves to acquire a beacon that is transmitted from the device 12, and synchronize the devices 12 with each other in order to establish a link between the devices 12. The coordinator 11 is accessible to each CMDB 2. The coordinator 11 may transmit a signal to the CMDB 2 and further, rewrite data described in the CMDB 2 if necessary. This coordinator 11 may search the CMDB 2 and read the data stored in the CMDB 2.

The wireless communication network 3 is not limited to a star type as illustrated in FIG. 2, but may adopt any network type such as a tree type or a mesh type.

A coexistence enabling function (CEF) is mounted on each of the wireless communication networks 3_1 to 3_P. A CEF 1 and a CEF P are mounted on the wireless communication network 3_1 and the wireless communication network 3_P, respectively. That is, the CEF 1 to CEF P mounted on the wireless communication networks 3_1 to 3_P, respectively are not the same as each other, but the respective functions are common.

When the CEF is mounted on the wireless communication network 3, the CEF is performed by storing a program thereof in a memory of the coordinator 11 or a hard disk, but the CEF may be, of course, mounted on the device 12.

The CEF is a program for preventing communication interference and performing a control for coexistence in the same communication space, between one wireless communication network 3 and other wireless communication network 3, so called, for decision making. Actually, when one wireless communication network 3 executes the coexistence method according to the present invention with other wireless communication network 3, one wireless communication network 3 executes processing based on the mounted CEF. As one function of the CEF, a command for modifying a parameter required for coexistence is given to the wireless communication network 3 or the device 12 thereof. The command is based on suggestion or information acquired from the CMDB 2.

In the present invention, while executing the method for coexistence among the plurality of wireless communication networks 3, the coexistence method is executed by always inquiring the details of the coexistence method of the CMDB 2 as well as based on the CEF. That is, each wireless communication network 3 inquires various information including positional information, a communication range, a channel, or the like of other wireless communication network 3, and the like of the CMDB 2 and further, inquires the coexistence method with other wireless communication network 3 of the CMDB 2. The wireless communication network 3 reflects information selected by the wireless communication network 3 or newly acquired information to the CMDB 2, and as a result, updated information is frequently stored in the CMDB 2. Other wireless communication network 3 also accesses the CMDB 2 frequently. When newly updated information is stored in the CMDB 2, other wireless communication network 3 may also acquire the newly updated information through the CMDB 2.

That is, in the present invention, in executing the method for coexistence among the plurality of wireless communication networks 3, the wireless communication networks 3 that execute the coexistence method do not have a direct conversation with each other, but have a conversation through the CMDB 2. The CMDB 2 is accessed by other wireless communication network 3 as well as among the plurality of wireless communication networks 3 that execute the coexistence method to frequently determine each information newly reflected to the CMDB 2, and further, newly execute the coexistence method by using the same.

Figure 3A:
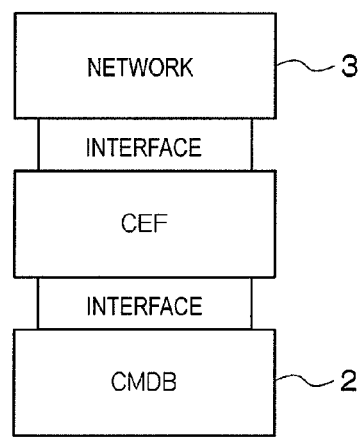
FIGS. 3A to 3C are diagrams illustrating an interface configuration in the system for coexistence between the wireless communication networks according to the present invention.
Figure 3B:
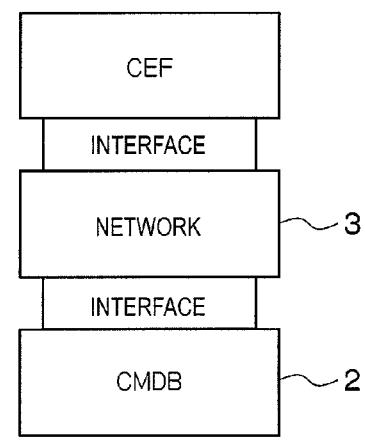
Figure 3C:
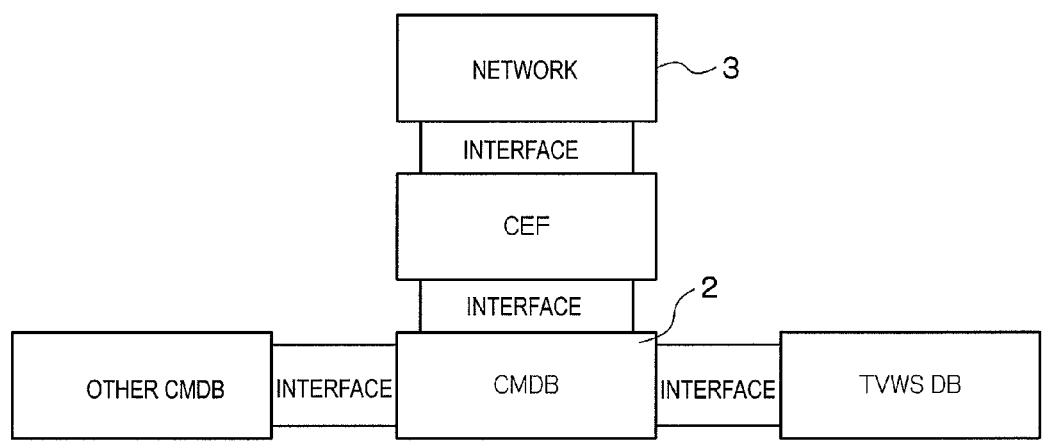

In the system 1 for coexistence between the wireless communication networks according to the present invention, an interface is configured as illustrated in FIG. 3A to 3C. FIG. 3A illustrates an example in which each wireless communication network 3 has the interface with the CEF, but does not have an interface with respect to the CMDB 2. In this case, each wireless communication network 3 accesses the CMDB 2 through the CEF. FIG. 3B illustrates an example in which each wireless communication network 3 has an interface with both the CEF and the CMDB 2. In this case, each wireless communication network 3 directly accesses the CMDB 2 under the control by the CEF. FIG. 3C illustrates an example in which the CMDB 2 newly transmits/receives data with a television white space (TVWS) band in the form of FIG. 3B. In this case, the CMDB 2 is interface-connected to a TVWS DB. The CMDB 2 may be interface-connected to other CMDB.

Figure 4:
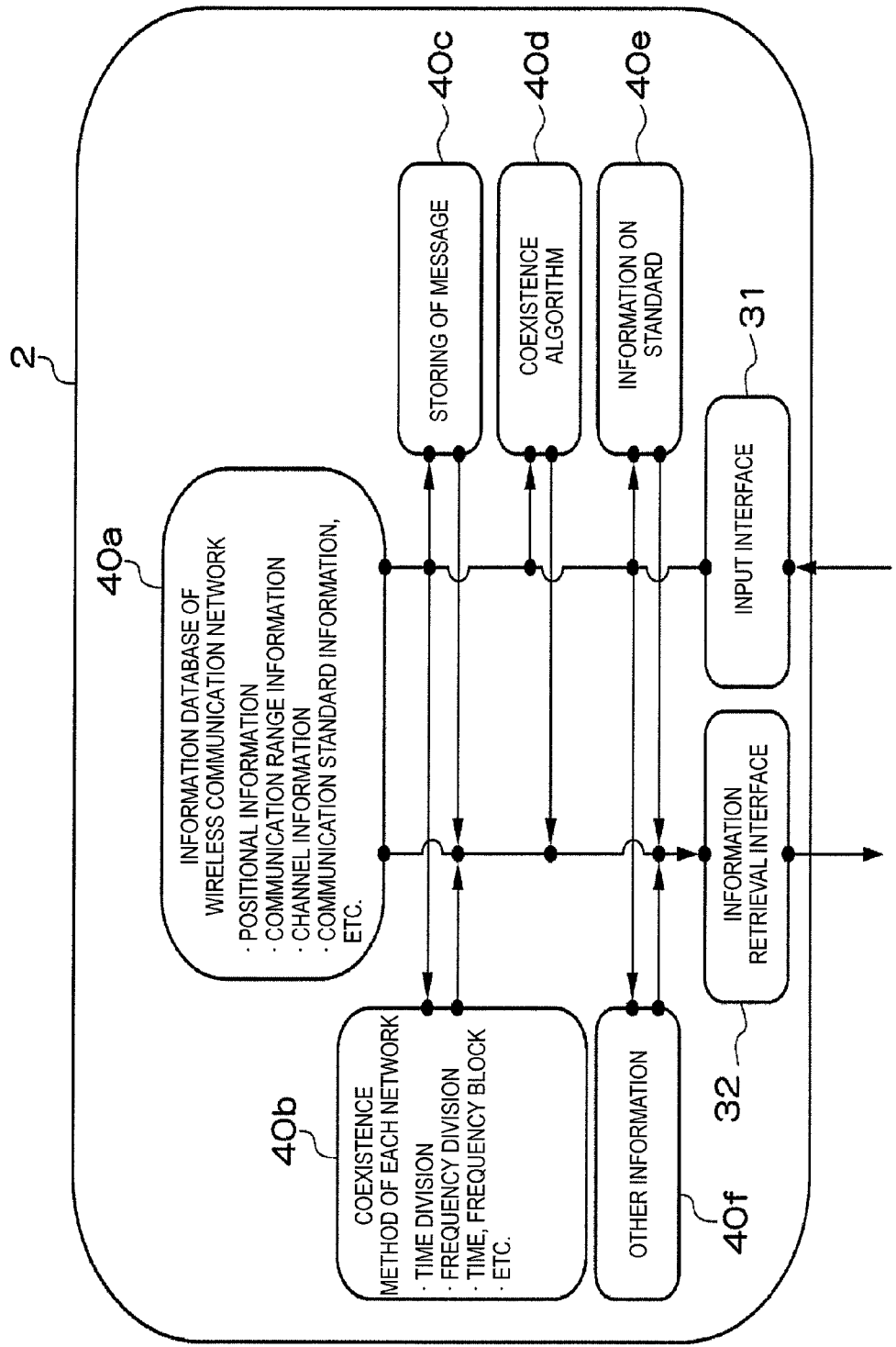
FIG. 4 is a configuration diagram of a database (CMDB) to which each wireless communication network is accessible.

FIG. 4 illustrates a configuration of the CMDB 2. In an area 40*a*, CMDB 2's own positional information, communication range information (for example, information indicating a range which a radio wave reaches when the radio wave is in 100 mW), and channel information indicating a frequency channel where each wireless communication network autonomously performs communication, for example, communication standard information indicating which communication standard of the IEEE each wireless communication network performs communication based on are recorded. In an area 40*b*, description of a detailed coexistence method of each wireless communication network 3, in particular, a purpose to coexist by time division or coexist by frequency division, or coexist by using both time division and frequency division is stored, but besides, various coexistence methods may be also stored in the area 40*b*.

An area 40*c* is an area for storing various information and message to be sent or notified from one wireless communication network 3 to the wireless communication network 3 at a coexistence counterpart. In an area 40*d*, a coexistence algorithm required for a control for actual coexistence between the respective wireless communication networks 3 is described. In an area 40*e*, information regarding a used standard is stored. The information regarding the standard is input into the area 40*e* from the outside. Various other information is stored in an area 40*f*.

Actually, when each wireless communication network 3 intends to input information in the CMDB 2 or update the information, each wireless communication network 3 accesses the CMDB 2 through an input interface 31. The wireless communication network 3 inputs the information in each of the areas 40*a* to 40*f* depending on the information to be input.

When each wireless communication network 3 intends to search the CMDB 2 and read information, each wireless communication network 3 accesses the CMDB 2 through an information retrieval interface 32. Each wireless communication network 3 retrieves the information to be read from each of the areas 40*a* to 40*f* and reads the information.

The structure of the CMDB 2 may be generally classified into two functions of a management function for controlling writing data in the corresponding CMDB 2 and reading the data, and a databank function for actually storing the data. In detail, coexistence management (CM) serves as the management function, and a coexistence databank (CDB) serves as the databank function. Hereinafter, although the CM and the CDB are not separated but are comprehensively described as the CMDB 2, the CMDB 2 may be described as a CM 2 and a CDB 2 particularly in detail.

Figure 5:
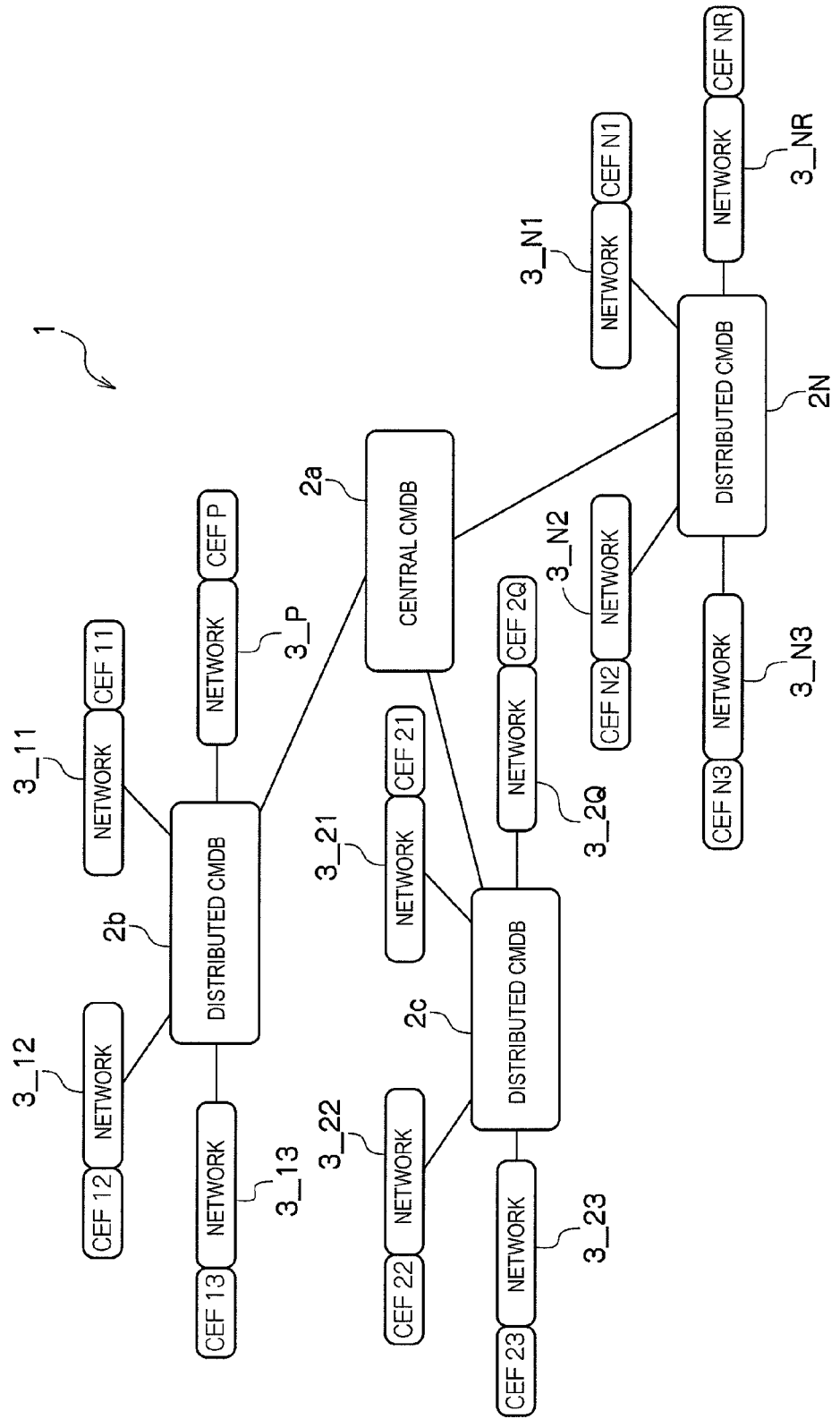
FIG. 5 is a diagram illustrating another configuration of the system for coexistence between the wireless communication networks according to the present invention.

The coexistence system 1 between the wireless communication networks 3 according to the present invention may be implemented as for example, a type illustrated in FIG. 5. That is, the CMDB 2 is constituted by a central CMDB 2*a* positioned at the center and distributed CMDBs 2*b* to 2*d* connected to the central CMDB 2*a*, respectively.

The central CMDB 2*a* serves as a central control unit and is not accessed by the wireless communication network 3. In this regard, a distributed CMDB 2*b* is accessed by wireless communication networks 3_11 to 3_1P, a distributed CMDB 2*c* is accessed by wireless communication networks 3_21 to 3_2Q, a distributed CMDB 2*d* is accessed by wireless communication networks 3_11 to 3_1P, and a distributed CMDB 2N is accessed by wireless communication networks 3_N1 to 3_NR.

Next, a coexistence method according to the coexistence system 1 between the wireless communication networks according to the present invention will be described. In an example below, the wireless communication network 3_1 in FIG. 1 accesses the CMDB 2 under the control by the CEF 1 and performs a control for coexistence with other wireless communication network 3.

Figure 6:
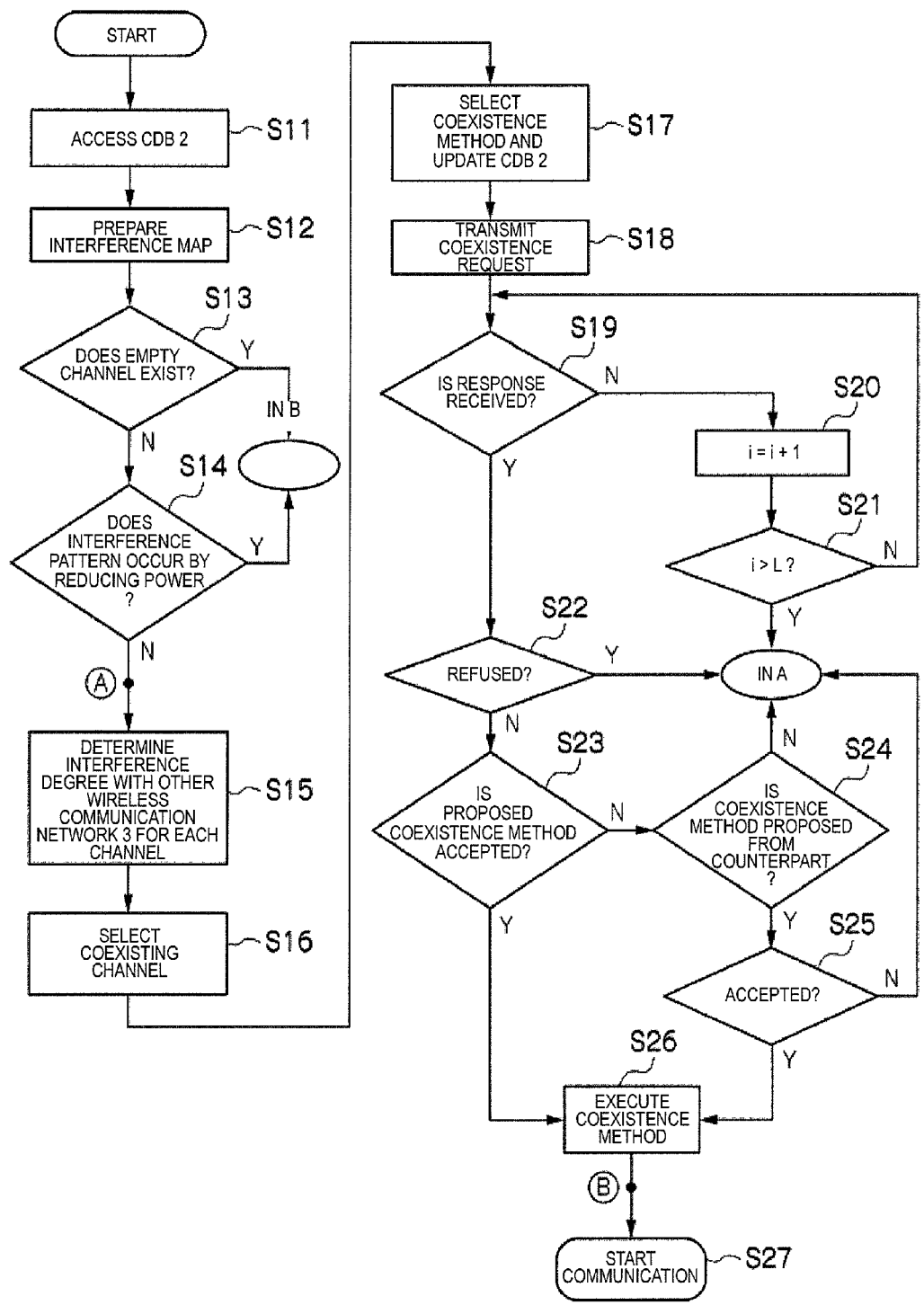
FIG. 6 is a flowchart for executing a method for coexistence between wireless communication networks according to the present invention.

FIG. 6 is a flowchart for executing the method for coexistence between the wireless communication networks according to the present invention.

First, in step S11, the wireless communication network 3_1 accesses a CDB 2 (CMDB 2). The wireless communication network 3_1 searches the CDB 2 (CMDB 2) and reads desired data.

Next, in step S12, the wireless communication network 3_1 prepares an interference map as well as checking whether other wireless communication network 3 exists. The interference map is prepared based on the data read from the CMDB 2 in step S11 described above. For example, it is checked whether the wireless communication networks 3_2, 3_3, and 3_P exist around the wireless communication network 3_1, and an interference degree of the wireless communication networks 3_2, 3_3, and 3_P with the wireless communication network 3_1 is determined in 2D or 3D from the positional relationship of the wireless communication networks, a range of the radio wave, or channel information. The interference map may be determined as a 2D image or a 3D image, but the interference map is not necessarily imaged only if the interference degrees of other wireless communication networks 3_2, 3_3, and 3_P can be determined.

Next, in step S13, the wireless communication network 3_1 determines whether an empty channel not used by other wireless communication networks 3_2, 3_3, and 3_P exists. The determination is performed based on the channel information for each of other wireless communication networks 3_2, 3_3, and 3_P, which is acquired by accessing the CMDB 2 in step S11. In step S13, when it is judged that the empty channel not used by other wireless communication networks 3_2, 3_3, and 3_P exists, the process proceeds to "B". When the process proceeds to "B", the process enters into step S27, and the wireless communication network 3_1 performs wireless communication by using the empty channel. In this regard, when the empty channel does not exist, the process proceeds to step S14.

In step S14, the wireless communication network 3_1 determines whether or not to reduce interference by narrowing each communication range of the wireless communication network 3_1 itself and/or other wireless communication networks 3_2, 3_3, and 3_P.

Figure 7A:
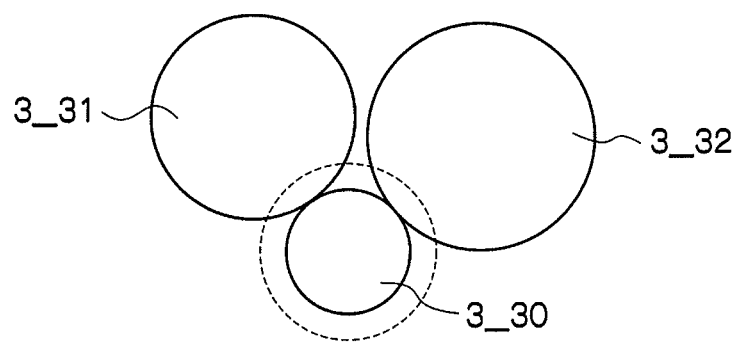
FIGS. 7A to 7C are diagrams for describing a detailed operation in step S14.

For example, as illustrated in FIG. 7A, when the communication power of a network 3_30 is high, a communication range thereof is expressed by a solid line, and interference between the network 3_30 and other networks 3_31 and 3_30 occurs. But only by decreasing the communication power of the network 3_30, the communication range may be narrowed up to a range expressed by a dotted line and thus communication interference does not occur.

Figure 7B:
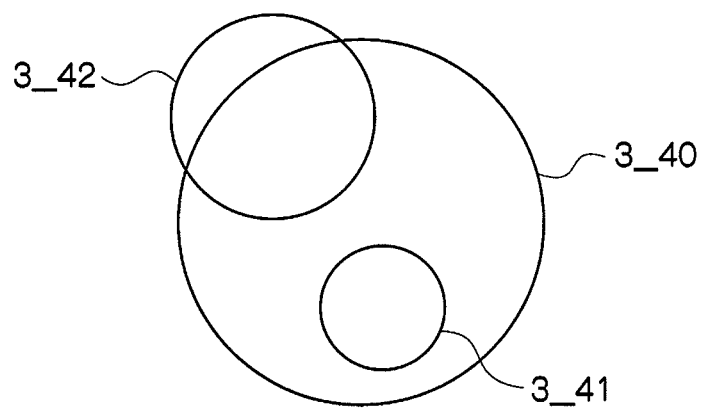

In this regard, in a case illustrated in FIG. 7B, although the communication range is narrowed by just decreasing the communication power of a network 3_40, communication interference between the network 3_40 and networks 3_41 and 3_42 occurs.

Figure 7C:
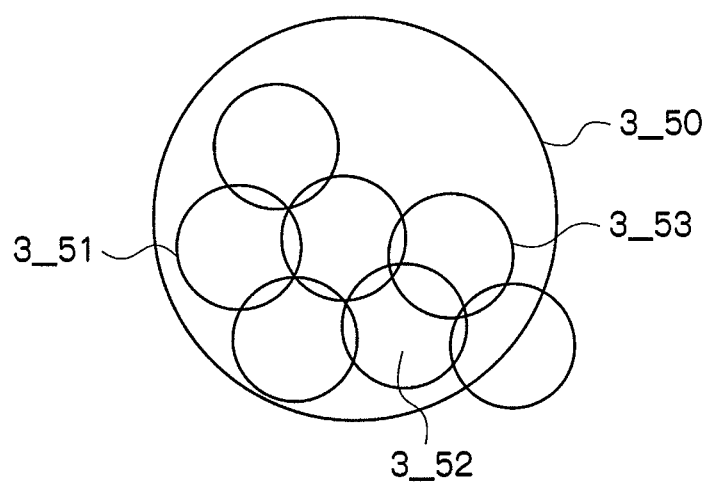

Similarly, in a case illustrated in FIG. 7C, although the communication range is narrowed by just decreasing the communication power of a network 3_50, communication interference between the network 3_50 and networks 3_51, 3_52, and 3_53 occurs.

As such, the determination in step S14 may be performed based on the positional relationship between and the communication ranges of the wireless communication networks 3. Actually, the determination may be performed based on the interference map prepared in step S12. In step S14, when the communication interference between the wireless communication network 3_1 and other wireless communication networks 3_2, 3_3, and 3_P is reduced up to an acceptable range only by decreasing the power of the wireless communication network 3_1, the process proceeds to "B". When the process proceeds to "B", the process enters into step S27, and the wireless communication network 3_1 performs wireless communication while reducing the communication power. In this regard, in the case that the communication interference between the wireless communication network 3_1 and other wireless communication networks 3_2, 3_3, and 3_P cannot be reduced up to the acceptable range only by decreasing the power of the wireless communication network 3_1, the process proceeds to step S15. In order to execute step S14, it is assumed that at least communication range information of other communication network 3 is stored in the CMDB 2.

Next, the process proceeds to step S15, and the wireless communication network 3_1 determines an interference degree with other wireless communication network 3 for each channel. That is, in this step S15, the wireless communication network 3_1 may access the CMDB 2 again and acquire the number of other wireless communication networks 3 for each channel. The interference degree of each channel may be acquired based on any parameter, but for example, the interference degree may be determined based on the interference map acquired in step S12.

Next, the process proceeds to step S16, and the wireless communication network 3_1 selects other wireless communication networks 3_2, 3_3, and 3P to coexist from now on, based on the determination result of step S15. Hereinafter, a case in which the wireless communication network 3_1 coexists with the wireless communication network 3_2 will be described as an example. Other coexisting wireless communication networks 3 may be two or more. In step S16, the wireless communication network 3_1 selects a channel that coexists with the wireless communication network 3_2. This channel is decided according to a priority order of 1) a channel having the lowest communication interference, 2) a channel capable of most easily controlling coexistence, 3) a channel which is used frequently for coexistence, 4) a channel capable of effectively using resources including the time, the frequency, and the like.

Next, the process proceeds to step S17, and the wireless communication network 3_1 selects a coexistence method for coexistence with the wireless communication network 3_2. As the coexistence method, for example, any one of time division, frequency division, and the combination of time division and frequency division may be selected, but other methods may be selected. In the case of frequency division, for example, OFDM may be used. The wireless communication network 3_1 updates and reflects other wireless communication network 3 and the channel selected in step S16, and the coexistence method selected in step S17 to the CDB 2 (CMDB 2).

Next, the process proceeds to step S18, and the wireless communication network 3_1 transmits a coexistence request for coexistence with the wireless communication network 3_2. A transmission destination of the coexistence request does not directly transmit the coexistence request to the counterpart wireless communication network 3_2 but transmits the coexistence request to the CMDB 2 anyway. As a result, a transmission request from the wireless communication network 3_1 is written in the CMDB 2. Other wireless communication networks 3 also access the CMDB 2 frequently. In this case, as the result that the counterpart wireless communication network 3_2 accesses the CMDB 2 and verifies that a transmission request to the counterpart wireless communication network 3_2 is written in the CMDB 2, a response thereto is transmitted to the wireless communication network 3_1, but the response is not directly transmitted to the wireless communication network 3_1 but transmitted to the CMDB 2.

In step S19, the wireless communication network 3_1 accesses the CMDB 2 at any time to verify whether there is the response from the wireless communication network 3_2. When there is the response from the wireless communication network 3_2, the process proceeds to step S22, and when there is no response, the process proceeds to step S20.

In step S20, 1 is added to a counter I of i=i+1, and the process proceeds to step S21. In step S21, the added counter i and a threshold L are compared with each other. As a result, if i>L, the process returns to "A". "A" is positioned between steps S14 and S15. In this regard, i≤L, the process returns to step S19 again, and it is verified whether there is a response from the wireless communication network 3_2. That is, when the counter i is equal to or less than L, a loop of repeatedly executing steps S19 to S21 is established. L represents what times it is repeatedly verified whether there is the response from the wireless communication network 3_2 and may be arbitrarily set by a user. Although the verification is repeated at L times, when the response from the wireless communication network 3_2 may not be verified, a flow after step S15 is repeatedly executed again.

When the process proceeds to step S22, the wireless communication network 3_1 verifies whether the wireless communication network 3_2 refuses the coexistence request. When the wireless communication network 3_2 refuses the coexistence request, the process proceeds to "A" and the flow after step S15 is repeatedly executed again. In this regard, when the wireless communication network 3_2 that makes the response does not refuse the coexistence request, the process proceeds to step S23.

When the process proceeds to step S23, the wireless communication network 3_1 determines whether the selected coexistence method is accepted by the wireless communication network 3_2. When the selected coexistence method is accepted by the wireless communication network 3_2, the process proceeds to step S26, and when not accepted, the process proceeds to step S24.

When the process proceeds to step S26, as the proposed coexistence method is accepted by the wireless communication network 3_2, a control for coexistence is executed based on the proposed coexistence method. Actually, while a protocol for coexistence is recorded in the CMDB 2 in advance, and the coexistence control may be performed by downloading the protocol from the CMDB 2 at the time of executing the control. After the control for coexistence between the wireless communication network 3_1 and the wireless communication network 3_2 is performed, the process proceeds to step S27 to start communication.

In this regard, when the process proceeds to step S24, it is verified whether a new coexistence method is proposed from the counterpart wireless communication network 3_2. When the new coexistence method is proposed from the wireless communication network 3_2, the process proceeds to step S25, and when not proposed, the process proceeds to "A" and the flow after step S15 is repeatedly executed.

When the process proceeds to step S25, the wireless communication network 3_1 determines whether or not to accept the coexistence method proposed from the counterpart wireless communication network 3_2. When the wireless communication network 3_1 accepts the corresponding coexistence method, the process proceeds to step S26, the accepted coexistence method is executed, and the process proceeds to step S27 to start communication. In this regard, when the wireless communication network 3_1 does not accept the coexistence method proposed from the wireless communication network 3_2, the process proceeds to "A" and the flow after step S15 is repeatedly executed again.

As set forth above, according to embodiments of the present invention, by accessing the CMDB 2 in which at least the positional information, channel information, and respective coexistence methods of other wireless communication networks 3 are stored, the interference degree with the corresponding other wireless communication network 3 is determined for each channel, other wireless communication network to coexist, the coexisting channel, and the coexisting method thereof are selected based on the interference degree for each determined channel and at the same time, are reflected to the CMDB 2. When the signal for requesting coexistence with the corresponding other selected wireless communication network 3 is transmitted to the CMDB 2 and the coexisting request is acquired by accessing the CMDB 2 by other selected wireless communication network 3, the control for coexistence in the communication space between one wireless communication network 3 and the corresponding other selected wireless communication network 3 is performed based on the channel reflected to the CMDB 2 and the coexisting method thereof.

As a result, the communication interference between the wireless communication networks 3 may be prevented, and the wireless communication networks 3 may coexist in the communication space by time division or frequency division.

According to the present invention, in particular, the existing system or the existing protocol may be used as it is, and the existing system or protocol may not be significantly modified.

Figure 8A:
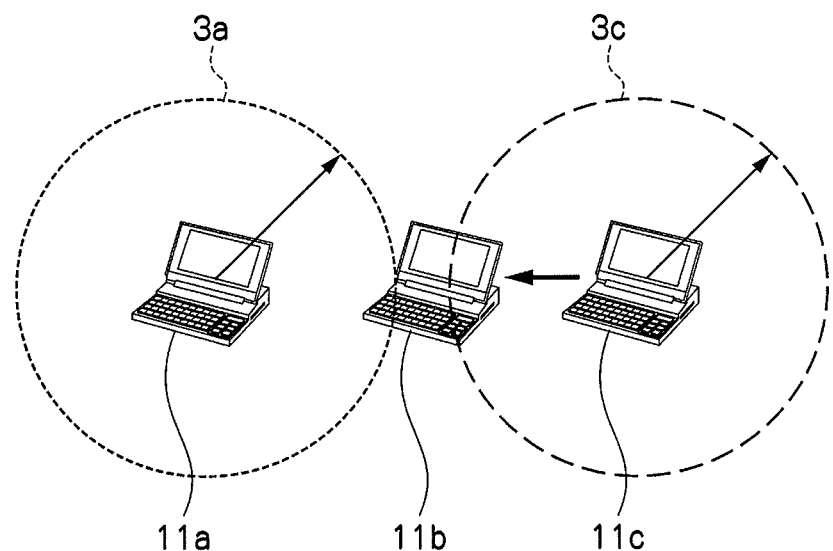
FIGS. 8A and 8B are diagrams for describing an effect of the system for coexistence between the wireless communication networks according to the present invention.

According to the present invention configured as above, as illustrated in FIG. 8A, it is possible to prevent the wireless communication network 3a having the coordinator 11a from resulting in a functional failure due to the coordinator 11b which is in a busy state by receiving a signal from the coordinator 11c of the wireless communication network 3c.

Figure 8B:
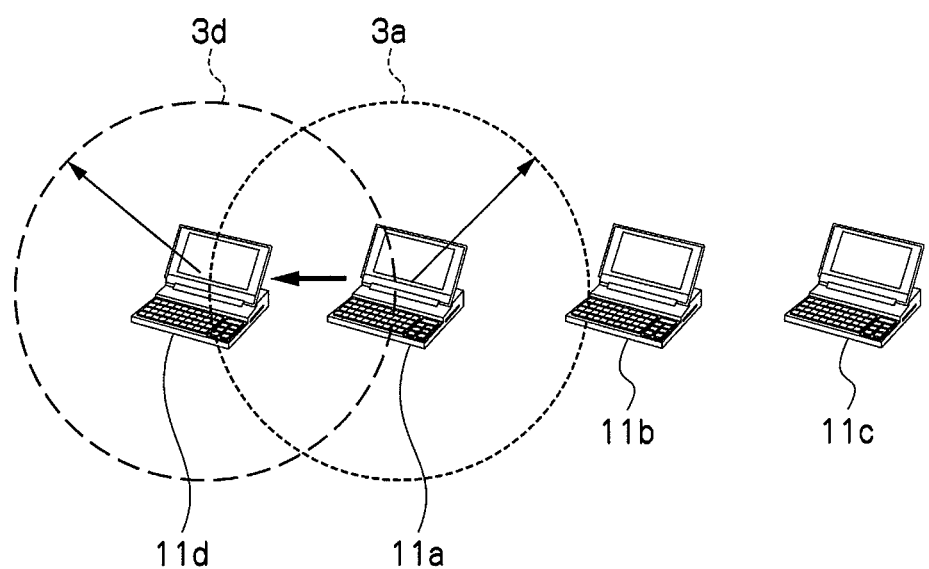

In general, as illustrated in FIG. 8B, when the coordinator 11b intends to transmit the signal to the coordinator 11c, the transmission of the signal is interferenced by signal transmission from the coordinator 11a of the wireless communication network 3a to the coordinator 11d of the wireless communication network 3d. As a result, the coordinator 11b may not transmit the signal to the coordinator 11c. In the present invention, the problem may also be solved.

In the embodiment, the case in which the wireless communication network 3 accesses the CMDB 2 has been described as an example, but as illustrated in FIG. 2, the device 12 is included as an element of the wireless communication network 3. As a result, all the accesses from the wireless communication network 3 is, of course, thought as the access from the device 12 included therein.

First Embodiment

Figure 9A:
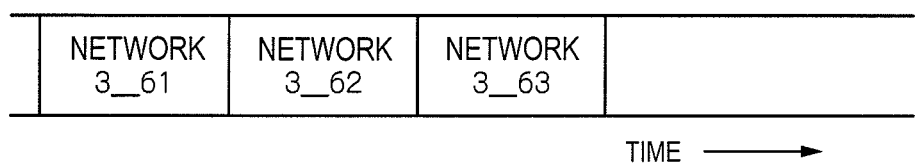
FIGS. 9A to 9C are diagrams illustrating an example of performing time division multiplexing in the system for coexistence between the wireless communication networks according to the present invention.
Figure 9B:
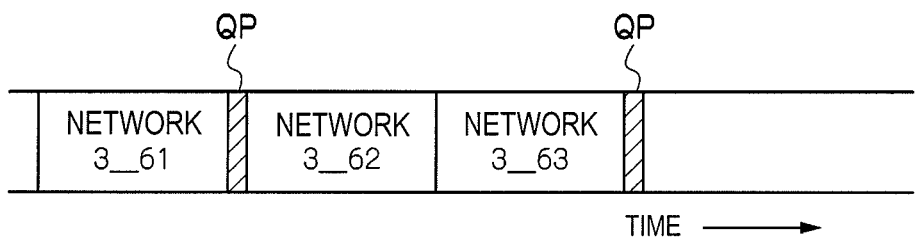

FIG. 9A illustrates an example of actually time division multiplexing wireless communication networks 3_61 to 3_63 by the coexistence system 1 according to the present invention. As the pattern, time-division multiplexing may be performed, and for example, as illustrated in FIG. 9B, a quiet period (QP) may be inserted between time-division multiplexed time zones. The quiet period (QP) is defined in IEEE 802.22 or IEEE 802.16h and used for signal detection. However, the quiet period QP may not be synchronized and may not be detected at the time of performing the control for coexistence. As a result, even in the time division multiplexing, the quiet period (QP) may be inserted between time division multiplexed areas, as illustrated in FIG. 9B.

Figure 9C:
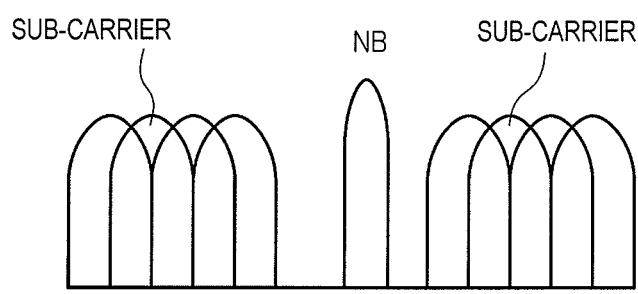
Figure 10:
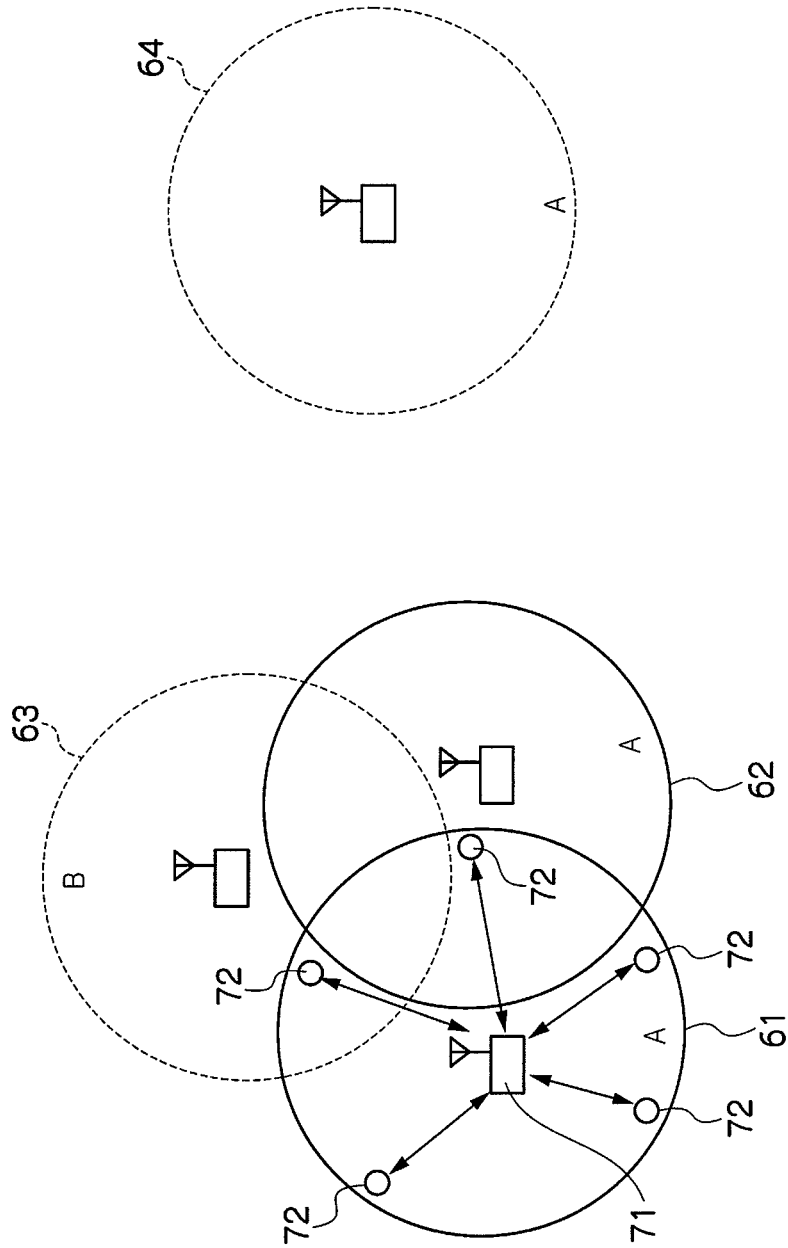
FIG. 10 is a diagram illustrating a general example in which communication interference occurs between a wireless communication network and other network.

FIG. 9C illustrates an example of actually frequency division multiplexing wireless communication network 3 by the coexistence system 1 according to the present invention. FIG. 9C illustrates an example of allocating each system to a sub-carrier and a narrow band (NB) based on orthogonal frequency division multiplexing (OFDM).

REFERENCE SIGNS LIST

1 System for coexistence between wireless communication networks
2 CMDB
3 Wireless communication network
11 Coordinator
12 Device

What is claimed is:
1. A method for coexistence between wireless communication networks which coexist in a communication space by time division and/or frequency division among a plurality of wireless communication networks, comprising, by one wireless communication network, the steps of:
determining an interference degree with the corresponding other wireless communication network for each channel by accessing a database storing at least positional information, channel information, and respective coexistence methods of other wireless communication networks;
selecting a corresponding other wireless communication network to coexist with, a coexisting channel, and a coexisting method thereof based on the determined interference degree for each determined channel, and at the same time, reflecting the selected network, channel, and coexistence method to the database;

transmitting a signal, for requesting coexistence with respect to the corresponding other selected wireless communication network, to the database; and performing a control for coexistence in the communication space between the one wireless communication network and the corresponding other selected wireless communication network, based on the channel and the coexistence method reflected to the database, when the database is accessed by the corresponding other selected wireless communication network and the corresponding other selected wireless communication network acquires the coexistence request.

2. The method for coexistence between wireless communication networks according to claim 1, wherein, when the database is accessed by the one wireless communication network, and it is determined that there is an empty channel not used by other wireless communication network, communication is performed by using the empty channel.

3. The method for coexistence between wireless communication networks according to claim 1, wherein, upon determining that interference is reduced by narrowing each communication range of the one wireless communication network and/or other wireless communication network, when the database further storing at least communication range information of other wireless communication network is accessed by the one wireless communication network, the communication power of the one wireless communication network and/or other wireless communication network is reduced.

4. The method for coexistence between wireless communication networks according to claim 1, wherein, when the control for coexistence in the communication space between the one wireless communication network and the corresponding other selected wireless communication network is performed, noting acceptance or lack of acceptance;

upon acceptance by the corresponding other selected wireless communication network of a coexistence method selected by the one wireless communication network, the control for coexistence is performed based on the coexistence method; and upon lack of acceptance by the corresponding other selected wireless communication network of the coexistence method selected by the one wireless communication network, a coexistence method is proposed from the corresponding other selected wireless communication network, and upon acceptance by the one wireless communication network of the proposed coexistence method, the control for coexistence is performed based on the coexistence method proposed by the corresponding other selected wireless communication network.

5. A system for coexistence between wireless communication networks which coexist in a communication space by time division and/or frequency division among a plurality of wireless communication networks, said system comprising said one wireless communication network that:

determines an interference degree with corresponding other wireless communication networks for each channel by accessing a database in which at least positional information, channel information, and respective coexistence methods of other wireless communication networks are stored;

selects as corresponding other wireless communication network to coexist with, a coexisting channel, and a coexisting method thereof based on the interference degree for each determined channel and at the same time, reflects the selected network, channel, and coexistence method to the database;

transmits a signal for requesting coexistence with respect to the corresponding other selected wireless communication network, to the database, and the corresponding other selected wireless communication network;

performs a control for coexistence in the communication space between the one wireless communication network, based on the channel and the coexistence method reflected to the database, when the database is accessed by the corresponding other selected wireless communication network to acquire the coexistence request.

6. The system for coexistence between wireless communication networks according to claim 5, wherein, when the one wireless communication network determines that there is an empty channel not used by other wireless communication network at the time of accessing the database, the one wireless communication network performs communication by using the empty channel.

7. The system for coexistence between wireless communication networks according to claim 5, wherein, upon determining that interference is reduced by narrowing each communication range of the one wireless communication network and/or other wireless communication network at the time of accessing the database, further storing at least communication range information of the other wireless communication network, the one wireless communication network and/or the other wireless communication network performing a control for reducing the communication power.

8. The system for coexistence between wireless communication networks according to claim 5, wherein, when the control for coexistence in the communication space between the one wireless communication network and the corresponding other selected wireless communication network is performed, noting acceptance or lack of acceptance;

upon acceptance by the corresponding other selected wireless communication network of a coexistence method selected by the one wireless communication network, the control for coexistence is performed based on the coexistence method;

upon lack of acceptance by the corresponding other selected wireless communication network of the coexistence method selected by the one wireless communication network, a coexistence method is proposed with respect to the one wireless communication network; and upon acceptance by the one wireless communication network of the proposed coexistence method, the control for coexistence is performed based on the coexistence method proposed by the corresponding other selected wireless communication network.

* * * * *